E. ZIMPEL.
BALANCE.
APPLICATION FILED OCT. 2, 1912.
1,078,029.
Patented Nov. 11, 1913.
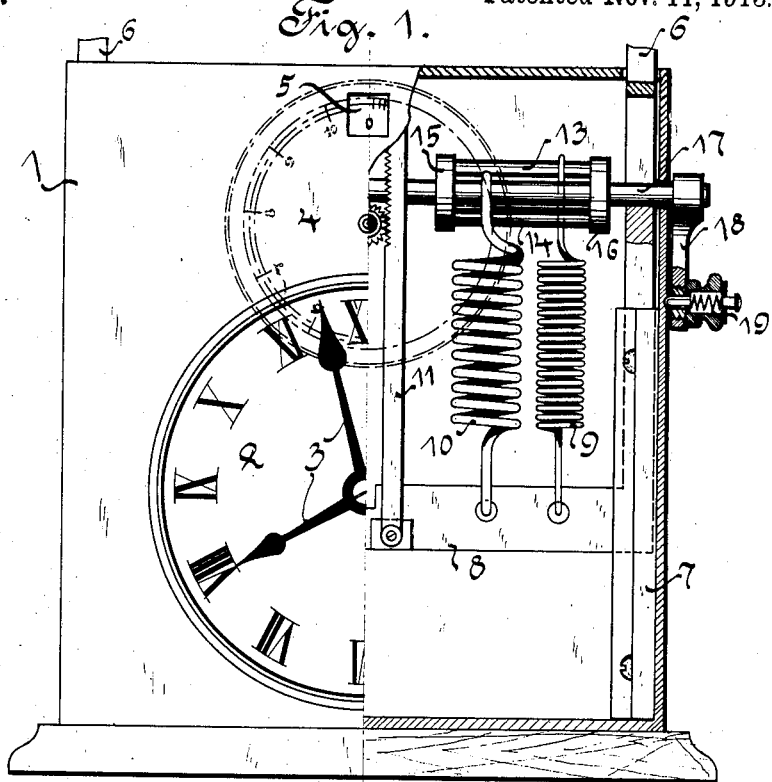

UNITED STATES PATENT OFFICE.

ERWIN ZIMPEL, OF GLOGAU, GERMANY.

BALANCE.

1,078,029.  Specification of Letters Patent.  Patented Nov. 11, 1913.

Application filed October 2, 1912. Serial No. 723,558.

*To all whom it may concern:*

Be it known that I, ERWIN ZIMPEL, a subject of the King of Prussia, German Emperor, residing at Glogau, Kingdom of Prussia, German Empire, have invented certain new and useful Improvements in Balances, of which the following is a specification.

This invention relates to a balance designed for house-hold use. The balance is however constructed in such a manner that it can also be used for weighing persons. A time-keeper is combined with the balance. The balance is arranged in such a manner that the mechanisms for weighing smaller weights are separated from the mechanism for weighing heavier weights. The casing of the balance is rectangular and the dial of the keeper is mounted upon the front wall at the lower part of the same. In the upper part of the front wall of the casing the window is arranged behind which appears the scale which indicates the weight of lighter objects. In the top plate of the casing there is arranged the window under which appears the scale which indicates the weight of heavier objects. The movable weighing plate for supporting the objects to be weighed is also arranged in the top plate of the casing. The scale for indicating the lighter weights consists of a disk mounted upon a shaft and driven by means of a toothed wheel and rack the scale for the heavier weights consists of a hoop upon which the numerals are marked and which is also driven by means of a toothed wheel and rack. The balance is a spring balance and the weighing plate which is guided in the casing by means of two vertical rods connected by a traverse is suspended to two pairs of springs of different tensions and in such a manner that one pair of springs is always out of gear according to the position of a hand-lever. When said hand-lever is turned, the racks for driving the scales are thrown in or out of gear according to the position of the lever by means of a wedge-shaped eccentric keyed upon the lever shaft. The springs are attached to bridges eccentrically mounted upon the main shaft. The main part of the weighing mechanism is arranged in the lower part of the casing near the rear wall of the same so that there is left sufficient space for the time-keeper.

The invention is shown by way of example.

Figure 1 shows the balance in front elevation, the right hand side part of the front wall of the casing being removed. Fig. 2 is a cross section through the casing which shows the inner mechanism in side elevation, the clock work being omitted. Fig. 3 represents in end view the eccentric of the lever shaft which serves for reversing the racks. Fig. 4 is a plan view of Fig. 3. Fig. 5 shows the hand lever in front elevation.

The improved balance is constructed as follows:—

Upon the front wall of the casing the dial 2 for the time keeper with the hands 3 and the window 5 are arranged; behind this window the scale 4 is located.

6 are the vertical guide rods of the weighing plate which is not shown in the drawings; 7 are the guides for the said vertical rods; 8 is the traverse which connects the lower ends of the vertical rods and to which the springs 9 and 10 are attached. The racks 11 and 12 are hingedly fixed with their lower ends to said traverse 8. The upper ends of the springs 9—10 are attached to horizontal rods 13—14 connected with the shaft 17 of the hand lever 18 by means of bridges 15 and 16 a spring button 19 serves for maintaining the hand lever 18 in its two extreme positions.

Fig. 2 shows the hoop 20 with the scale the numerals of which are visible through the window 21 of the top plate of the casing and the lever shaft 17 is located in a vertical slot 24 a guide stud 22 engaging with the symmetrical vertical slot 23. 25 is the shaft for the scale 4 and 26 is the toothed wheel for revolving said shaft 27 in the hollow shaft for the hoop 20, the toothed wheel 28 serving for revolving said hollow shaft. The racks 11 and 12 are mounted upon a bracket 29.

30 is the hand knob for winding up the time-keeper. The eccentric 31 keyed upon the lever shaft 17 is shown in Figs. 3 and 4.

In Fig. 2 the stronger spring 10 is shown in the inoperative position the spring 9 being thrown in gear.

I claim:—

An improved balance for household use comprising in combination with the casing having a window in its front wall and a window in its top wall, said balances being adapted for weighing lighter and heavier objects, an indicating scale for the weight of the lighter objects mounted behind the window in the front wall, a hoop with the indicating scale for the heavier weights mounted under the window of the top wall, two pairs of springs one for the heavier weight and one for the lighter weight, vertical guide-rods of the usual weighing, a traverse connecting the lower ends of said vertical rods to which the lower ends of said springs are attached, two racks connected with said traverse, a horizontal hollow shaft of the indicating hoop, a horizontal shaft of the indicating scale for the lower weight mounted in said hollow shaft, a toothed wheel upon each of said hollow shafts engaging with the corresponding rack, a hand-lever mounted upon the side wall of the casing so that it can be moved to two extreme positions a shaft of said hand lever, two bridges eccentrically keyed upon said shaft, two rods fixed in the ends of said bridges adapted to engage with the upper ends of said springs and an eccentric keyed upon said shaft for bringing one of the racks into engagement with its corresponding toothed wheel when the other rack is thrown out of gear according to the position of said hand-lever and a time-keeper in the lower part of the casing, substantially as described and shown and for the purpose set forth.

In witness whereof I have hereunto set my hand in the presence of two witnesses.

ERWIN ZIMPEL.

Witnesses:
 FRIZ LEISCHNER,
 ERNST KATZ.